US012737782B2

(12) United States Patent
Kataoka et al.

(10) Patent No.: US 12,737,782 B2
(45) Date of Patent: Sep. 15, 2026

(54) DEMAND PREDICTION DEVICE, DEMAND PREDICTION METHOD, AND MEDIUM

(71) Applicant: NEC Corporation, Tokyo (JP)

(72) Inventors: Akihito Kataoka, Tokyo (JP); Yudai Yamaguchi, Tokyo (JP); Riki Eto, Tokyo (JP); Natsumi Usui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/808,396

(22) Filed: Aug. 19, 2024

(65) Prior Publication Data

US 2026/0050936 A1 Feb. 19, 2026

(30) Foreign Application Priority Data

Aug. 22, 2023 (JP) ................................ 2023-134709

(51) Int. Cl.
*G06Q 30/0202* (2023.01)
*G06N 20/00* (2019.01)

(52) U.S. Cl.
CPC ......... *G06Q 30/0202* (2013.01); *G06N 20/00* (2019.01)

(58) Field of Classification Search
CPC ..... G06Q 30/0202; G06N 20/00; G06N 20/20
See application file for complete search history.

(56) References Cited

U.S. PATENT DOCUMENTS 9,519,912 B2 * 12/2016 Chidlovskii ........... G06N 20/00
11,551,078 B2 * 1/2023 Okadome .......... G06Q 30/0202
2015/0134413 A1 * 5/2015 Deshpande ........ G06Q 30/0205 705/7.31
2019/0236545 A1 * 8/2019 Umezu .................. G06Q 10/08
2019/0251609 A1 * 8/2019 Nakano .................. G06N 20/00
2020/0065669 A1 * 2/2020 Okadome .............. G06N 3/045
2020/0134642 A1 * 4/2020 Morgan ........... G06Q 10/06315
2020/0327485 A1 * 10/2020 Shi ..................... G06Q 30/0205

FOREIGN PATENT DOCUMENTS

| | | | | |
|---|---|---|---|---|
| JP | 2017-027632 A | | 2/2017 | |
| JP | 2020199388 A | * | 12/2020 | ......... A61B 17/7083 |
| JP | 7244777 B2 | * | 3/2023 | ......... G06Q 30/0202 |
| KR | 20220089591 A | * | 6/2022 | ............. G06N 20/20 |
| WO | WO-2012114481 A1 | * | 8/2012 | ............. G06Q 10/08 |
| WO | WO-2017163278 A1 | * | 9/2017 | ............. G16Z 99/00 |
| WO | WO-2019131140 A1 | * | 7/2019 | ............. G06Q 30/02 |
| WO | WO-2025164050 A1 | * | 8/2025 | ............. G06Q 10/04 |

* cited by examiner

*Primary Examiner* — Dylan C White
(74) *Attorney, Agent, or Firm* — Sughrue Mion, PLLC

(57) ABSTRACT

A demand prediction device is a device predicting a demand quantity for a target product based on a prediction model, and the demand prediction device specifies a similar product to the target product, calculates a base demand quantity for the target product by using the prediction model weighted in accordance with the similar product and a feature of the target product, the prediction model is a model in which two or more types of individual learning models are integrated and a weigh is set for each of the individual learning models, the individual learning model is a model that outputs the demand quantity in accordance with a feature of a product, receives an operation of changing the weight for each of the individual learning models, and calculates a predicted demand quantity for the target product by using the prediction model. The present disclosure can be used to support decision making.

10 Claims, 12 Drawing Sheets

Fig.5
PRODUCT REGISTRATION
OUTERWEAR
TOPS
PULLOVER
TURTLENECK SWEATER
HOODIE
LONG-SLEEVE POLO SHIRT
TRAINER
BOTTOMS

90
92
RAM
91
PROCESSOR
96
95
INPUT/OUTPUT INTERFACE
99
PERIPHERAL DEVICES
93
ROM
94
STORAGE DEVICE
98
PROGRAM
97
DRIVE DEVICE
80
STORAGE MEDIUM

DEMAND PREDICTION DEVICE, DEMAND PREDICTION METHOD, AND MEDIUM

This application is based upon and claims the benefit of priority from Japanese Patent Application No. 2023-134709, filed on Aug. 22, 2023, the disclosure of which is incorporated herein in its entirety by reference.

TECHNICAL FIELD

The present disclosure relates to a demand prediction device, a demand prediction method, and a recording medium.

BACKGROUND ART

There is a technique for predicting the demand for a product using a prediction model.

JP 2017-027632 A discloses a technique for aggregating actual demand records regarding similar products of a prediction target product and performing demand prediction according to a release time of the prediction target product by using the actual demand records and a prediction model.

SUMMARY

It is an object of the present disclosure to provide a demand prediction device and the like, which are capable of performing demand prediction in consideration of a user's intention regarding a target product.

Solution to Problem

A demand prediction device according to an aspect of the present disclosure is a device predicting a demand quantity for a target product based on a prediction model, the prediction model is a model in which two or more types of individual learning models are integrated and a weigh is set for each of the individual learning models, the individual learning model is a model that outputs the demand quantity in accordance with a feature of a product, and the demand prediction device includes a specification unit that specifies a similar product similar to the target product, a calculation unit that calculates a base demand quantity for the target product by using the prediction model weighted in accordance with the similar product and a feature of the target product, and an operation reception unit that receives an operation of changing the weight for each of the individual learning models, and the calculation unit calculates a predicted demand quantity for the target product by using the prediction model reflecting the change operation.

A demand prediction method according to an aspect of the present disclosure is a method for predicting a demand quantity for a target product based on a prediction model, the method includes specifying a similar product similar to the target product, calculating a base demand quantity for the target product by using the prediction model weighted in accordance with the similar product and a feature of the target product, the prediction model is a model in which two or more types of individual learning models are integrated and a weigh is set for each of the individual learning models, the individual learning model is a model that outputs the demand quantity in accordance with a feature of a product, receiving an operation of changing the weight for each of the individual learning models, and calculating a predicted demand quantity for the target product by using the prediction model reflecting the change operation.

A program according to an aspect of the present disclosure is a program for predicting a demand quantity for a target product based on a prediction model, the prediction model is a model in which two or more types of individual learning models are integrated and a weigh is set for each of the individual learning models, the individual learning model is a model that outputs the demand quantity in accordance with a feature of a product, and the program causes a computer to execute a process of specifying a similar product similar to the target product, a process of calculating a base demand quantity for the target product by using the prediction model weighted in accordance with the similar product and a feature of the target product, and a process of receiving an operation of changing the weight for each of the individual learning models, and the process of calculating includes calculating a predicted demand quantity for the target product by using the prediction model reflecting the change operation.

BRIEF DESCRIPTION OF THE DRAWINGS

Exemplary features and advantages of the present disclosure will become apparent from the following detailed description when taken with the accompanying drawings in which.

EXAMPLE EMBODIMENT

Hereinafter, example embodiments of the present disclosure will be described with reference to the drawings. In the present disclosure, each of the drawings is associated with one or more example embodiments.

First Example Embodiment

An overview of a demand prediction device according to a first example embodiment will be described.

Figure 1:
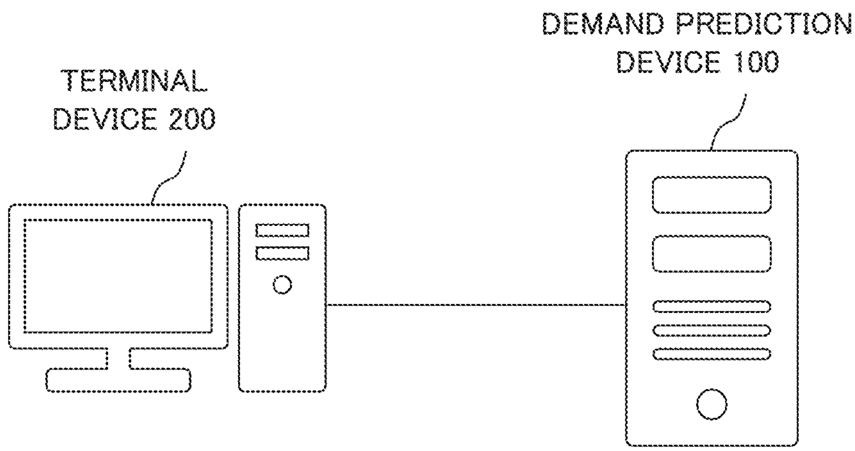
FIG. 1 is a diagram schematically illustrating an example of a configuration including a demand prediction device according to the present disclosure.

FIG. 1 is a diagram schematically illustrating an example of a configuration including a demand prediction device 100. The demand prediction device 100 is communicably connected to, for example, a terminal device 200 via a wireless or wired network.

The demand prediction device 100 is a device that predicts a demand quantity for a product. For example, the demand prediction device 100 predicts the demand quantity for the target product by using a prediction model that outputs the demand quantity. The demand quantity is, for example, a sales volume or a sales amount of a product, but is not limited to this example. The demand prediction device 100 is, for example, a server device. The demand prediction device 100 may be implemented as a cloud server. Further, the demand prediction device 100 may be implemented as a device constituting a system. For example, a demand prediction system including the demand prediction device 100 and the terminal device 200 may be implemented.

The predicted demand quantity is output to the terminal device 200, for example. The terminal device 200 is a computer device having an input/output function. The terminal device 200 is, for example, a personal computer. The terminal device 200 is used by a user. An example of the user is a person who is in charge of a product such as a demand planner. The user is not limited to this example. The user can check the predicted demand quantity. The demand prediction device 100 receives operations related to predicting the demand quantity from the user via the terminal device 200, for example. The demand prediction device 100 predicts further demand quantities reflecting the operations, and outputs the predicted demand quantities to the terminal device 200. The present invention is not limited to this example, and the demand prediction device 100 may be implemented in various forms.

Next, an example of a functional configuration of the demand prediction device 100 will be described.

Figure 2:
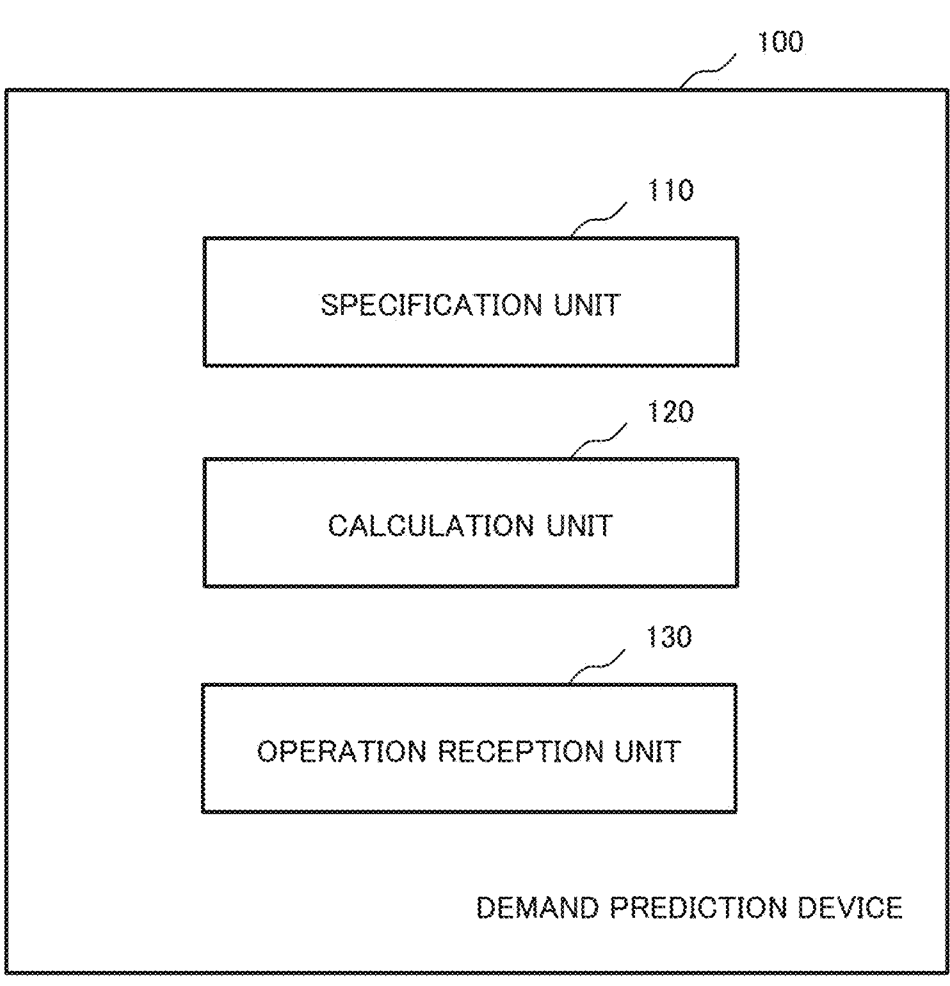
FIG. 2 is a first block diagram illustrating an example of a functional configuration of the demand prediction device according to the present disclosure.

FIG. 2 is a block diagram illustrating an example of a functional configuration of the demand prediction device 100. The demand prediction device 100 includes a specification unit 110, a calculation unit 120, and an operation reception unit 130.

The specification unit 110 specifies similar products similar to the target product. For example, the specification unit 110 specifies similar products by using feature information of the product. The feature information is information indicating a feature related to a product. The feature may include elements of the product itself such as category, characteristics, and selling price. The category indicates a category to which the product belongs in a product group. The characteristics indicate the properties that the product possesses. For example, it is assumed that the product is a polo shirt. In this case, the category is tops. The characteristics include color, material, functionality, and the like. The product is merely an example. The product is not limited to clothing items. The present invention is not limited to this example, and the feature may include further information. The specification unit 110 may specify the similar products by comparing the feature information of the target product with each of the feature information of a plurality of products. The method for specifying the similar products is not limited to this example.

As described above, the specification unit 110 specifies the similar products similar to the target product. The specification unit 110 is an example of a specification means.

The calculation unit 120 calculates the demand quantity for the target product by using the prediction model. The prediction model outputs the demand quantity for the product. For example, the prediction model is a model in which a plurality of types of individual learning models are integrated. The individual learning model outputs the demand quantity in accordance with the feature of the product. The individual learning model may be a pre-trained model learned by learning the relationship between the product feature and the demand quantity by machine learning. For example, the individual learning model receives the feature of the product as an input and outputs the demand quantity. At this time, a weight is set to each of the individual learning models. For example, the prediction model may be a model that aggregates values obtained by multiplying the demand quantity output for each individual learning model by weights and outputs a value obtained by the aggregation as the demand quantity for the target product. As described above, the prediction model may be a model in which a plurality of types of individual learning models are integrated and weighting is set in each individual learning model. The prediction model is not limited to this example.

The weight set in the individual learning model is determined for each product. For example, the weight set in the individual learning model may be changed for each product. The calculation unit 120 calculates the demand quantity for the target product by using the prediction model weighted according to the similar product. For example, the calculation unit 120 sets a weight of each individual learning model as a weight associated with a similar product. Next, the calculation unit 120 inputs the feature of the target product to the prediction model in which the weight associated with the similar product is set. The input feature is input to each of the individual learning models. Then, the calculation unit 120 may calculate the demand quantity output from the prediction model as the demand quantity for the target product. Hereinafter, the demand quantity calculated by using the prediction model is referred to as a base demand quantity.

As described above, the calculation unit 120 calculates the base demand quantity for the target product by using the prediction model weighted in accordance with the similar product and the feature of the target product. The calculation unit 120 is an example of a calculation means.

The operation reception unit 130 receives various operations from the user. Specifically, the operation reception unit 130 receives operations of parameters for the prediction model. The parameter is information that affects the output of the demand quantity by the prediction model. An example of the parameter is a weight of each individual learning model used when outputting the demand quantity by the prediction model. For example, the operation reception unit 130 receives an operation of changing the weight of each individual learning model.

As described above, the operation reception unit 130 receives an operation of changing the weight for each of the individual learning models. The operation reception unit 130 is an example of an operation reception means.

When the operation of the parameter is received by the operation reception unit 130, the calculation unit 120 calculates the demand quantity for the target product in accordance with the operation. Specifically, the calculation unit 120 calculates the demand quantity for the target product by using the prediction model reflecting the operation. Here, the demand quantity calculated by using the prediction model reflecting the operation is referred to as a predicted demand quantity.

Next, an example of an operation of the demand prediction device 100 will be described with reference to FIG. 3.

In the present disclosure, each step in the flowchart is represented using a number assigned to each step, such as "S1".

Figure 3:
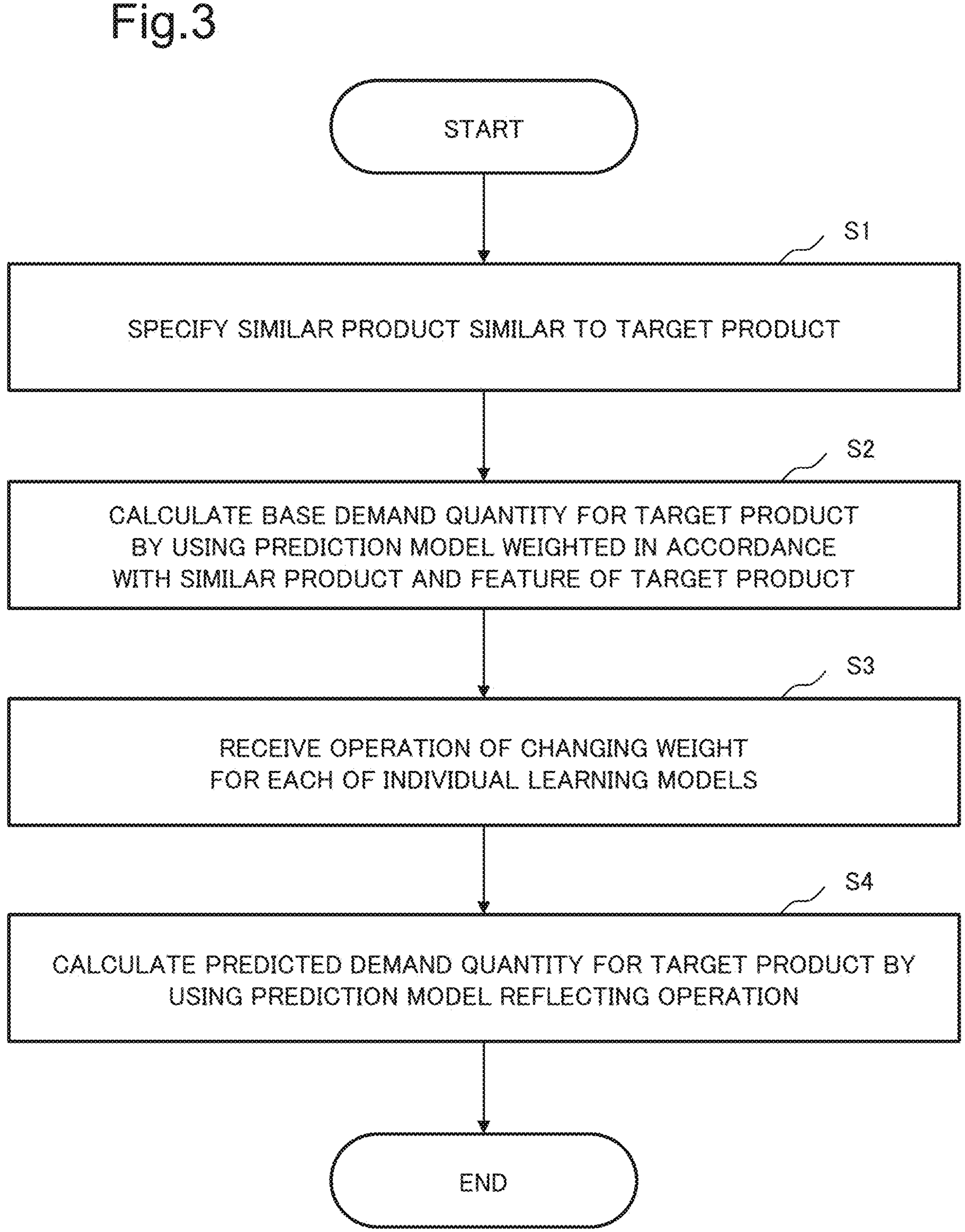
FIG. 3 is a first flowchart illustrating an example of an operation of the demand prediction device according to the present disclosure.

FIG. 3 is a flowchart illustrating an example of an operation of the demand prediction device. The specification unit 110 specifies the similar products similar to the target product (S1). The calculation unit 120 calculates the base demand quantity for the target product by using the prediction model weighted in accordance with the similar product and the feature of the target product (S2). The operation reception unit 130 receives an operation of changing the weight for each of the individual learning models (S3). Then, the calculation unit 120 calculates the predicted demand quantity for the target product by using the prediction model reflecting the operation (S4).

As described above, the demand prediction device 100 of the first example embodiment is a device that predicts the demand quantity for the target product based on the prediction model. At this time, the prediction model is a model in which a plurality of types of individual learning models are integrated and weighting is set in each individual learning model. The individual learning model is a model that outputs the demand quantity in accordance with the feature of the product. The demand prediction device 100 specifies the similar products similar to the target product. The demand prediction device 100 calculates the base demand quantity for the target product by using the prediction model weighted in accordance with the similar product and the feature of the target product. Further, the demand prediction device 100 receives an operation of changing the weight for each of the individual learning models. Then, the demand prediction device 100 calculates the predicted demand quantity for the target product by using the prediction model reflecting the operation.

Concerning the target product, there may be matters to be emphasized or matters not to be emphasized compared with similar products. The demand prediction device 100 can receive such consideration of the matters as, for example, an operation of changing the weight of the individual learning model. Accordingly, the demand prediction device 100 can calculate the demand quantity for the target product in a case in which such matters are taken into consideration. That is, the demand prediction device 100 can perform demand prediction in which the user's intention regarding the target product is considered.

The demand prediction device 100 can present the base demand quantity calculated before the operation on the prediction model and the predicted demand quantity calculated after the operation. Therefore, by comparing the base demand quantity with the predicted demand quantity, the user can also consider how much each operation affects the demand quantity. That is, the demand prediction device 100 can also support decision-making regarding actions for selling a product.

Second Example Embodiment

Next, a demand prediction device according to a second example embodiment will be described. In the second example embodiment, another example of the demand prediction device 100 described in the first example embodiment will be described. Description of contents overlapping with those of the first example embodiment will be partially omitted. In the present example embodiment, an example in which the product is a clothing item will be mainly described, but the product is not limited to this example.

[Details of Demand Prediction Device 100]

Figure 4:
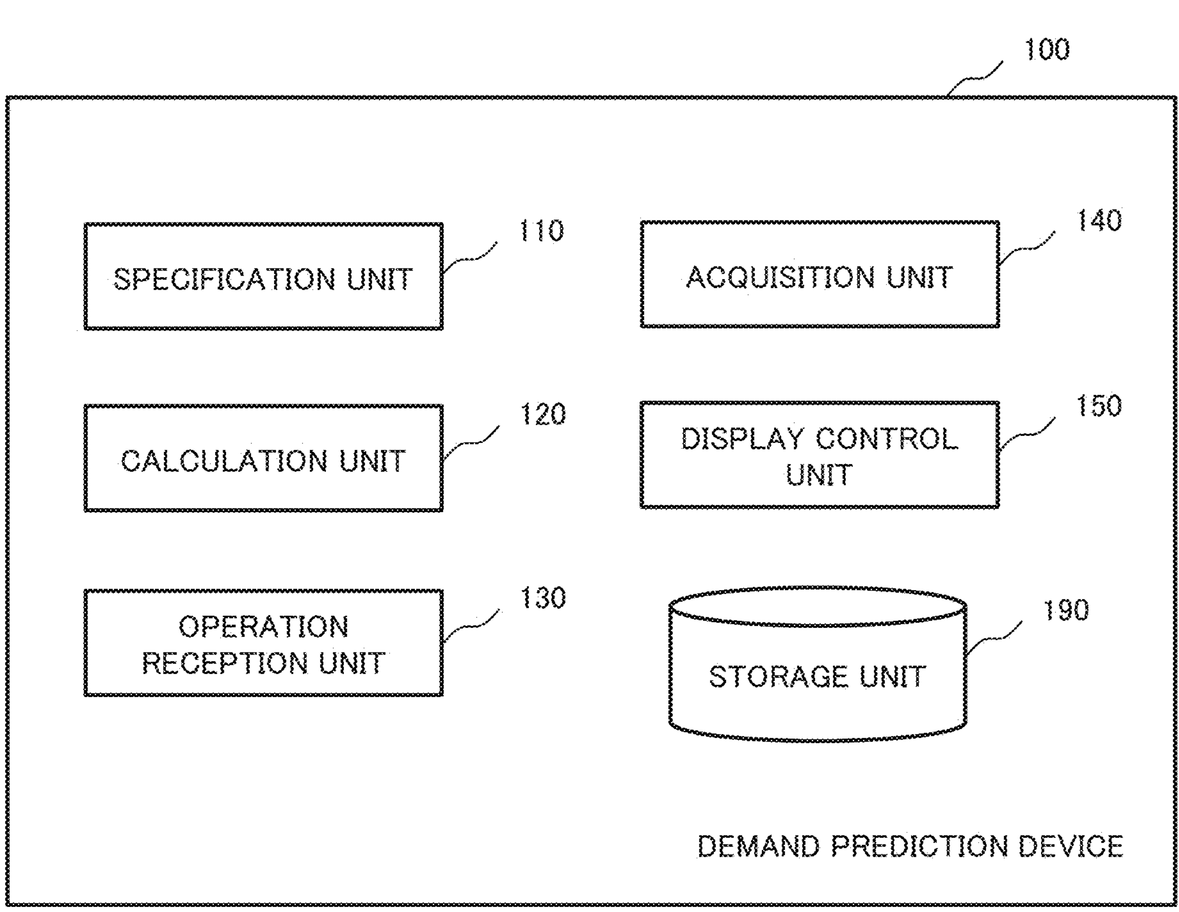
FIG. 4 is a second block diagram illustrating an example of a functional configuration of the demand prediction device according to the present disclosure.

FIG. 4 is a block diagram illustrating an example of a functional configuration of the demand prediction device 100. As illustrated in FIG. 4, the demand prediction device 100 includes a specification unit 110, a calculation unit 120, an operation reception unit 130, an acquisition unit 140, and a display control unit 150. The demand prediction device 100 is communicably connected to the terminal device 200, similarly to the first example embodiment. The terminal device 200 is, for example, a personal computer, but is not limited to this example. The terminal device 200 may be a portable terminal such as a smartphone or a tablet terminal. The terminal device 200 has an input/output function. For example, the terminal device 200 may be equipped with an input device such as a keyboard, a mouse, a touch panel, a camera, a barcode reader, or an integrated circuit (IC) reader. The terminal device 200 may be equipped with an output device such as a display, a printer, a speaker, or a lamp.

The demand prediction device 100 includes a storage unit 190. The storage unit 190 may be provided in an external device capable of communicating with the demand prediction device 100. The storage unit 190 stores various types of information. For example, the storage unit 190 stores a database. The database includes the feature information of each product. For example, the feature information of the product is input in advance by the user in the terminal device 200. Then, the input feature information is registered in the database. At this time, identification information identifying a product and feature information of the product is registered in the database in association with each other. Furthermore, the storage unit 190 stores actual performance information. The actual performance information includes information indicating actual sales performance of the product. For example, the actual performance information indicates information on a sales amount and a sales volume of products sold in the past.

The acquisition unit 140 acquires the feature information indicating the feature related to the product. The feature includes, for example, elements of the product itself such as category, characteristics, and selling price, but is not limited to this example. For example, it is assumed that the product is a polo shirt. In this case, the category is tops. The characteristics include color, material, functionality, and the like. When the product is cargo pants, the category is bottoms, and the characteristics include color, material, functionality, and the like. Even if the product is various trousers, jackets, coats, underwear, shoes, and the like, the features may be similarly defined. The features may include information about strategies to be implemented for the product, information about the external environment during product sale, and the like. The information regarding strategies includes the content of a promotion conducted for sales promotion, the investment scale in the promotion, and the like. The content of the promotion includes advertisement media such as a television CM, a web advertisement, a magazine, or a flier, a place where the promotion is conducted, and the like. The information about the external environment includes a weather condition, an occurrence status of a disaster, an occurrence status of an infectious disease, an exchange rate, and the like at the time of product sales. The feature may include further information.

The acquisition unit 140 may acquire information input by the user in the terminal device 200 as the feature information of the target product. In this case, the user inputs the feature information of the target product to the terminal device 200. The acquisition unit 140 may acquire the input information from the terminal device 200.

Alternatively, acquisition unit 140 may acquire the feature information of the target product from other devices having the feature information of the product. For example, the acquisition unit 140 may acquire the feature information of the target product from the database stored in the storage unit 190.

In the present example embodiment, the acquisition unit 140 acquires the feature information from the database. Specifically, acquisition unit 140 acquires the identification information of the target product from the terminal device 200. The acquisition unit 140 acquires the feature information of the target product from the database based on the acquired identification information. At this time, the identification information may be input in the terminal device 200 by the user's operation.

As described above, the acquisition unit 140 acquires the feature information indicating the feature related to the target product. The acquisition unit 140 is an example of an acquisition means.

The specification unit 110 specifies similar products similar to the target product. The specification unit 110 may use the feature information of the target product. Specifically, the specification unit 110 specifies one or more similar products from the database having the feature information of a plurality of products. At this time, the specification unit 110 may specify the similar products by calculating the similarity between the target product and the product indicated in the database by using the feature information.

For example, the specification unit 110 compares the feature information of the target product with the feature information of each product shown in the database. At this time, all the features may not be compared. For example, the specification unit 110 may compare only elements of the product itself. The specification unit 110 calculates the similarity in such a way that the larger the number of matched features, the larger the value. The specification unit 110 may specify a product whose similarity exceeds a threshold as the similar product.

Alternatively, the specification unit 110 may calculate the distance between the products by coordinating the features. More specifically, the specification unit 110 calculates the distance between the coordinates based on the feature of the target product and the coordinates based on each feature of the product shown in the database. The specification unit 110 calculates a similarity indicating a value that increases as the calculated distance decreases. The specification unit 110 may specify a product whose similarity exceeds a threshold as the similar product.

Alternatively, the specification unit 110 may specify the similar product by using a similarity calculation model generated by machine learning. The similarity calculation model may be a model generated by supervised learning. At this time, the similarity calculation model is generated, for example, by performing learning by using the feature information of a plurality of products as learning data and information indicating whether the products are similar to each other as a correct answer. A method of generating the similarity calculation model is not limited to this example. For example, the specification unit 110 inputs the feature information of the target product to the similarity calculation model generated as described above. The similarity between the target product and the product shown in the database is calculated by the similarity calculation model. The specification unit 110 may specify a product whose calculated similarity exceeds a threshold as the similar product.

The display control unit 150 causes various types of information to be displayed on the display of the terminal device 200. Specifically, the display control unit 150 displays a list of similar products specified by the specification unit 110. At this time, the display control unit 150 may display information in which the specified similar products are arranged in descending order of similarity. That is, the display control unit 150 may display the ranking of the similar products according to the similarity.

As described above, the display control unit 150 displays a list of one or more specified similar products. The display control unit 150 is an example of a display control means.

The display control unit 150 displays the demand quantity calculated by the calculation unit 120. A display example of various types of information by the display control unit 150 will be described later.

The calculation unit 120 calculates the demand quantity for the target product by using the prediction model. The prediction model is a model that outputs the demand quantity for the product. The demand quantity may be a sales volume or a sales amount. The prediction model may be a model that outputs the demand quantity of the product in a predetermined period. For example, the calculation unit 120 calculates a total demand quantity in a predetermined period. Furthermore, the calculation unit 120 may calculate the demand quantity for each unit period in a predetermined period. That is, the fluctuation in the demand quantity in a predetermined period may be output. An example of the predetermined period is a period from the start of sales to a predetermined number of days afterward. The present disclosure is not limited to this example, and the predetermined period may be a period from a certain day after the start of sales to a predetermined number of days afterward. A specific example of the prediction model will be described later.

The operation reception unit 130 receives various operations from the user. Specifically, the operation reception unit 130 receives operations of parameters that affect the output of the demand quantity for the prediction model. As the parameters are operated, the demand quantity output by the prediction model changes. A specific example of the operation of the parameter will be described later together with a specific example of the prediction model.

The calculation unit 120 calculates the demand quantity for the target product again by using the prediction model in which the operations of the parameters have been performed. As described above, the demand quantity for the target product calculated by the prediction model in which the operations of the parameters have been performed by the user is referred to as a predicted demand quantity. That is, the predicted demand quantity can also be referred to as a demand quantity calculated by a prediction technique reflecting the user's intention. On the other hand, the base demand quantity is a demand quantity for the target product calculated by the prediction model in which the operations of the parameters have not been performed by the user.

[Specific Example of Prediction Model]

Next, a specific example of the prediction model will be described.

The prediction model is a model that outputs the demand quantity based on the similar product similar to the target product. The similar product is specified by the specification unit 110. Then, the calculation unit 120 may calculate the base demand quantity based on the specified similar product.

An example of the model that outputs the demand quantity based on the similar product is a pre-trained model weighted in accordance with the similar product. The pre-trained model is a model in which a plurality of types of individual learning models are integrated. The pre-trained model is referred to as an integrated learning model. The integrated learning model is a model weighted for each individual learning model. The integrated learning model outputs the demand quantity with the feature of the product as an input. Here, the individual learning model is a pre-trained model in which the relationship between the feature of the product and the demand quantity is learned by machine learning. For example, when the feature of the product is input to the integrated learning model, the feature is input to each of the individual learning models. At this time, the integrated learning model aggregates values obtained by multiplying the demand quantity output for each individual learning model by weights and outputs a value obtained by the aggregation as the demand quantity for the target product.

The individual learning model may be a regression formula generated by regression analysis in which an objective variable is a demand quantity and an explanatory variable is a feature. For example, the individual learning model may be generated by sparse linear regression such as least absolute shrinkage and selection operator (LASSO) regression. The machine learning technique for generating the individual learning model is not limited to this example.

The individual learning models are different types of pre-trained models. Specifically, the individual learning models may be models having explanatory variables or coefficients of explanatory variables which are different from each other. At this time, the individual learning models may be models associated with factors that affect the demand quantity. Examples of the factors that affect the demand quantity include the appearance of the product, the contents of the product, the external environment during product sales, and strategies conducted for the product. Each of these factors has a feature of a product concerned. For example, in a case in which the product is a clothing item, the "appearance" relates to features such as category, material, color, and the presence or absence of a logo. "Contents" relate to, for example, features such as selling price, production location, functionality, and brand. "External environment" relates to, for example, a weather condition, an occurrence status of a disaster, an occurrence status of an infectious disease, an exchange rate, and the like during product sales. "Strategies" relate to, for example, features such as the content of a promotion conducted for sales promotion and the investment scale of the promotion. That is, the individual learning model can be referred to as a model that outputs a demand quantity with a feature related to an associated factor as an input. The same feature may be associated with a plurality of factors. For example, the features such as the material and the functionality may be associated with "appearance" and "content". The factors include "appearance", "contents", "external environment", and "strategies", but the factors are not limited to this example. The factor may vary depending on various products and various industries to which the demand prediction device 100 is applied.

The individual learning model may be a demand quantity prediction model that focuses on a specific factor. For example, the individual learning model focusing on the appearance may be a demand quantity output model that uses the features associated with the appearance such as category, material, color, and the presence or absence of a logo. Alternatively, the individual learning model focusing on the appearance may be a demand quantity output model in which the features associated with the appearance are weighted more than other features. The individual learning models may be models having a set of mutually different features as an input. The integrated learning model is, for example, a model in which a plurality of types of individual learning models are integrated, and is a demand quantity prediction model which is weighted for each individual learning model. Assuming that one individual learning model is $X_n$ (n is a natural number of 1 or more), the integrated learning model can also be expressed as, for example, the following Formula 1.

$$f(X_1,X_2, \ldots ,X_n)=a_1X_1+a_2X_2+ \ldots +a_nX_n \quad \text{(Formula 1)}$$

$a_n$ is a coefficient indicating a weight. For an, for example, the following Formula 2 is established.

$$a_1+a_2+ \ldots +a_n=1 \quad \text{(Formula 2)}$$

As described above, the integrated learning model may be a model that calculates a value obtained by multiplying the demand quantity output for each individual learning model by the set weight, adds the calculated value, and outputs the demand quantity. From Formula 2, the weight can be said to be a ratio of the individual learning model in the integrated learning model. As the weight is larger, the more the individual learning model associated with the weight affects the demand quantity output by the integrated learning model. That is, the larger the weight, the more important the factor associated with the individual learning model is in the calculation of the demand quantity. That is, the weight of each individual learning model can be said to indicate the degree of influence of the factor on the demand quantity output by the integrated learning model. Formulas 1 and 2 are merely examples. The integrated learning model is not limited to this example.

The weight is preset. The weight may be set for each product. For example, the weight associated with the product may be input in advance by the user. Alternatively, the weight may be set in accordance with the actual sales performance of the product. Specifically, the weight may be set in such a way that the total demand quantity in the predetermined period output by the integrated learning model and the total demand quantity in the predetermined period based on the actual sales performance of the product have the same value. The present disclosure is not limited to this example, and the settings of the weight may be performed by various techniques.

The calculation unit 120 inputs the acquired feature information of the target product to the integrated learning model. Each of the features shown in the feature information is input to the individual learning model. At this time, a value associated with one similar product is set as the weight for each of the individual learning models. Then, the calculation unit 120 calculates the demand quantity output by the integrated learning model as the base demand quantity of the target product in the predetermined period.

The operation reception unit 130 may receive an operation of changing the weight for each of the individual learning models with respect to the integrated learning model. At this time, the calculation unit 120 calculates the predicted demand quantity of the target product in the predetermined period by inputting the feature information of the target product to the integrated learning model in which the weight of each individual learning model is changed.

The operation reception unit 130 may receive an operation of changing the individual learning model itself. Specifically, the operation reception unit 130 may receive an operation of changing a mathematical formula indicating the individual learning model. For example, it is assumed that the individual learning model is a regression formula generated by regression analysis. At this time, the operation reception unit 130 may receive an operation of changing a coefficient, a constant term, and the like in the regression formula. If the individual learning model itself is changed, the range of possible values output by the individual learning model is changed.

In a case in which the individual learning model is generated by regression analysis, there is a data group indicating the actual sales performance for each set of features of the product. Then, the individual learning model is generated as a regression formula indicating the relationship between the feature and the demand quantity by learning the data group. The operation reception unit 130 may receive an operation of the data group learned at this time. For example, the user performs an operation of excluding specific data learned in generation of a specific individual learning model from a learning target or changing various values shown in the specific data. The operation reception unit 130 may receive selection of an individual learning model from the user, and may receive a change operation for the data group learned in generation of the selected individual learning model. As described above, the operation reception unit 130 may receive a change operation for the data group to be used in machine learning performed when generating the individual learning model. The calculation unit 120 calculates the predicted demand quantity of the target product in the predetermined period by inputting the feature information of the target product to the integrated learning model in which the change operation is reflected. The parameters to be changed are not limited to this example.

[Display Example of Various Information]

Next, various display examples displayed by the display control unit 150 will be described. In this example, the display control unit 150 causes various types of information to be displayed on the display of the terminal device 200.

Figure 5:
FIG. 5 is an example of an input screen according to the present disclosure.

When the acquisition unit 140 acquires the feature information of the target product, the display control unit 150 displays an input screen prompting the user to input information related to the target product. FIG. 5 is an example of the input screen. For example, the user selects "long-sleeve polo shirt" of "tops". The acquisition unit 140 acquires identification information associated with the selected "long-sleeve polo shirt". Then, the acquisition unit 140 may acquire the feature information of the "long-sleeve polo shirt" from the database based on the identification information associated with the "long-sleeve polo shirt".

In the example of FIG. 5, when "product registration" is selected, the display control unit 150 may cause an input form of the feature of the product to be displayed on the display of the terminal device 200. For example, the user inputs the feature of the product in the input form. The acquisition unit 140 acquires information indicating the feature of the product input. Then, the acquisition unit 140 may register the acquired information in the database in association with the identification information of the product as the feature information.

Figure 6:
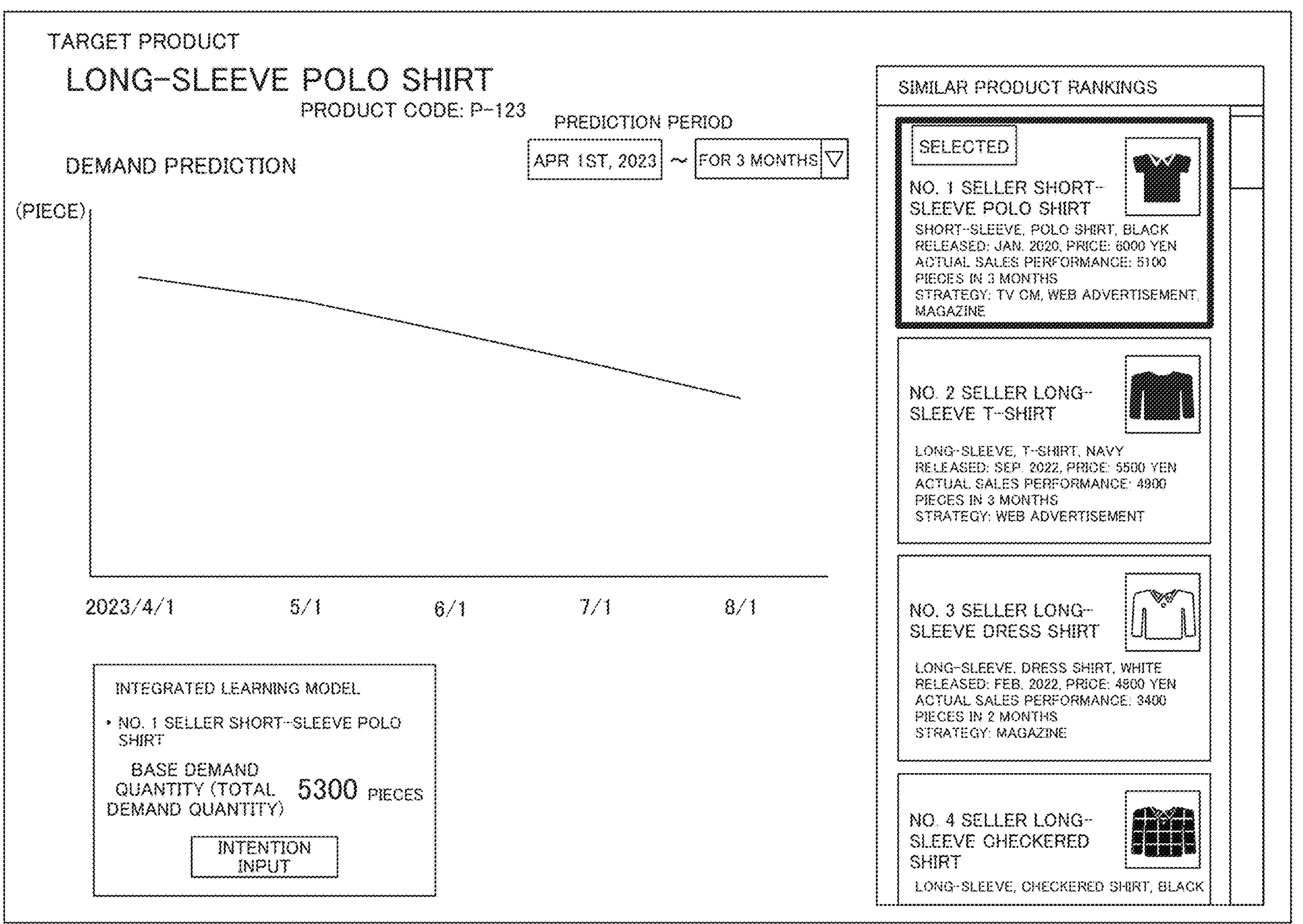
FIG. 6 is a diagram illustrating a first example of output information according to the present disclosure.

The display control unit 150 displays output information including the calculated demand quantity. FIG. 6 is a diagram illustrating a first example of the output information. In the example of FIG. 6, the output information in a case in which the target product is a "long-sleeve polo shirt" is displayed. The output information indicates a similar product ranking. The similar product ranking is a list of similar products specified by the specification unit 110. Information indicating the similar products is arranged in descending order of similarity. The user selects one of the similar products shown in the similar product ranking. The operation reception unit 130 receives the selection. In the example of FIG. 6, a "short-sleeve polo shirt" is selected.

For example, when the selection of the similar product is received by the operation reception unit 130, the calculation unit 120 calculates the base demand quantity of the target product by using the prediction model. In the example of FIG. 6, the base demand quantity calculated with three months from Apr. 1, 2023 as a target period is illustrated. The prediction model is an integrated learning model. In this example, the integrated learning model outputs the demand quantity based on the selected similar product "short-sleeve polo shirt".

Furthermore, in this example, a total demand quantity in the target period and a line graph illustrating a variation in the demand quantity in the target period are illustrated. The total demand quantity is a sales volume. For example, the total demand quantity in the target period calculated by the integrated learning model is 5300 points. The variation in the demand quantity in the target period calculated by the integrated learning model is indicated by a line graph.

In addition, the user performs the operations of the parameters for the prediction model. For example, the user selects an icon of "intention input" indicated in the block of the integrated learning model. As the icon is selected, the operation reception unit 130 displays a parameter input screen for the integrated learning model.

Figure 7:
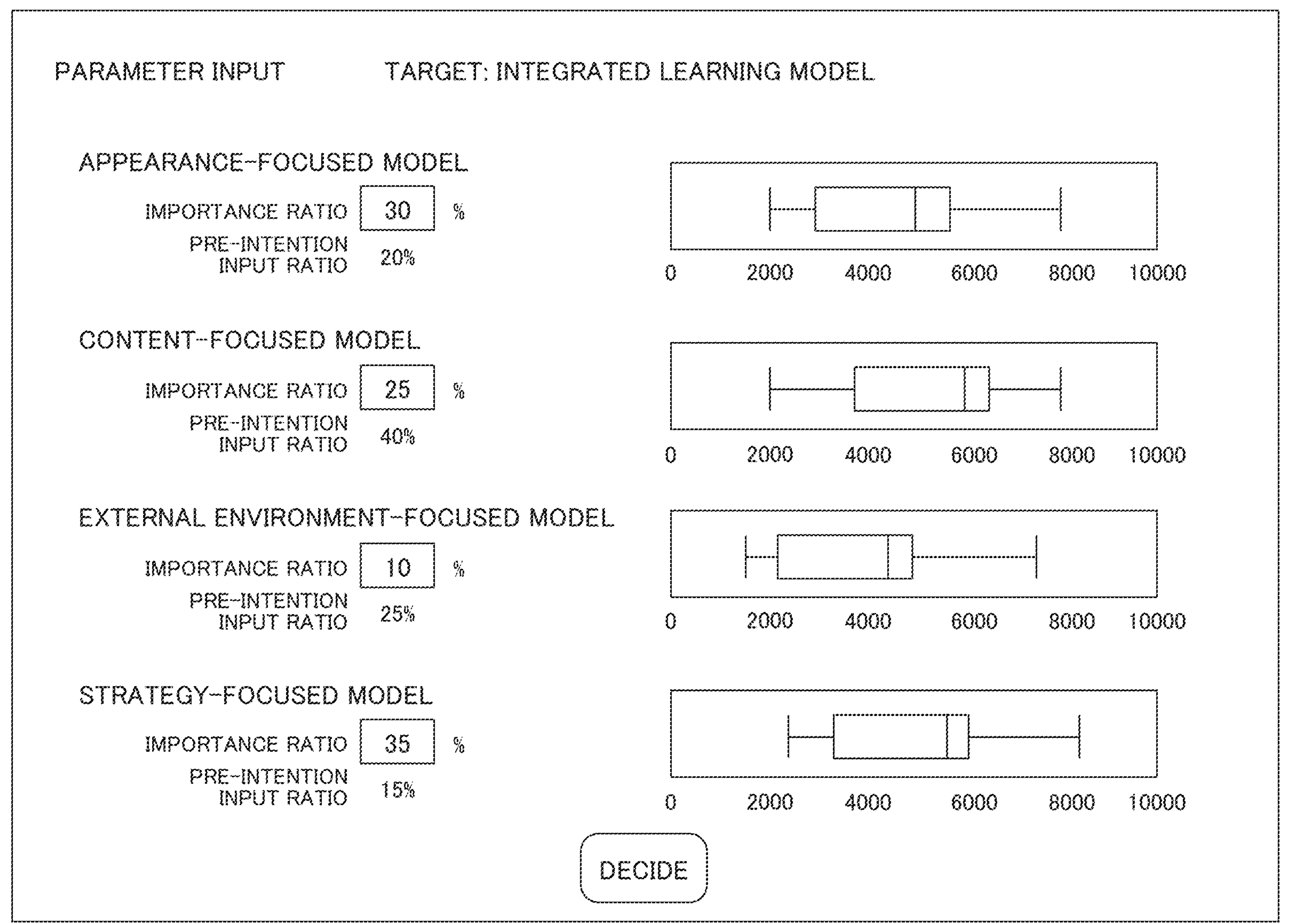
FIG. 7 is a diagram illustrating an example of a parameter input screen according to the present disclosure.

FIG. 7 is a diagram illustrating an example of the parameter input screen. The parameter input screen in FIG. 7 is associated with the integrated learning model. In this example, the integrated learning model is configured by four individual learning models of an appearance-focused model, a content-focused model, an external environment-focused model, and a strategy-focused model. A pre-intention ratio indicates a preset weight. That is, the pre-intention ratio is a weight associated with the similar product selected by the user. An importance ratio is a weight input by the user. That is, the input of the importance ratio is an operation of changing the weight for the individual learning model. For example, in the example of FIG. 7, the weight of the appearance-focused model associated with the similar product is 20%. Then, the weight of the appearance-focused model is changed to 30% by the change operation by the user. That is, the calculation unit 120 calculates the predicted demand quantity by using the integrated learning model in which the weight of the appearance-focused model is 30%.

A box-and-whisker diagram in the example of FIG. 7 illustrates a distribution of a data group indicating an actual sales performance for each set of product features used in generation of the individual learning model. For example, the user performs an operation of changing a numerical value or the like on the box-and-whisker diagram. As a result, the individual learning model itself is changed. For example, in a case in which the individual learning model is represented by a regression formula represented by a linear function, the linear function translates or the slope of the linear function changes due to the change operation. That is, the range of possible values of the individual learning model is changed.

The operation reception unit 130 can receive the change operation. The parameter input screen for receiving the change operation is not limited to this example. For example, sliders for operating various parameters or options of various parameters may be displayed on the parameter input screen.

Figure 8:
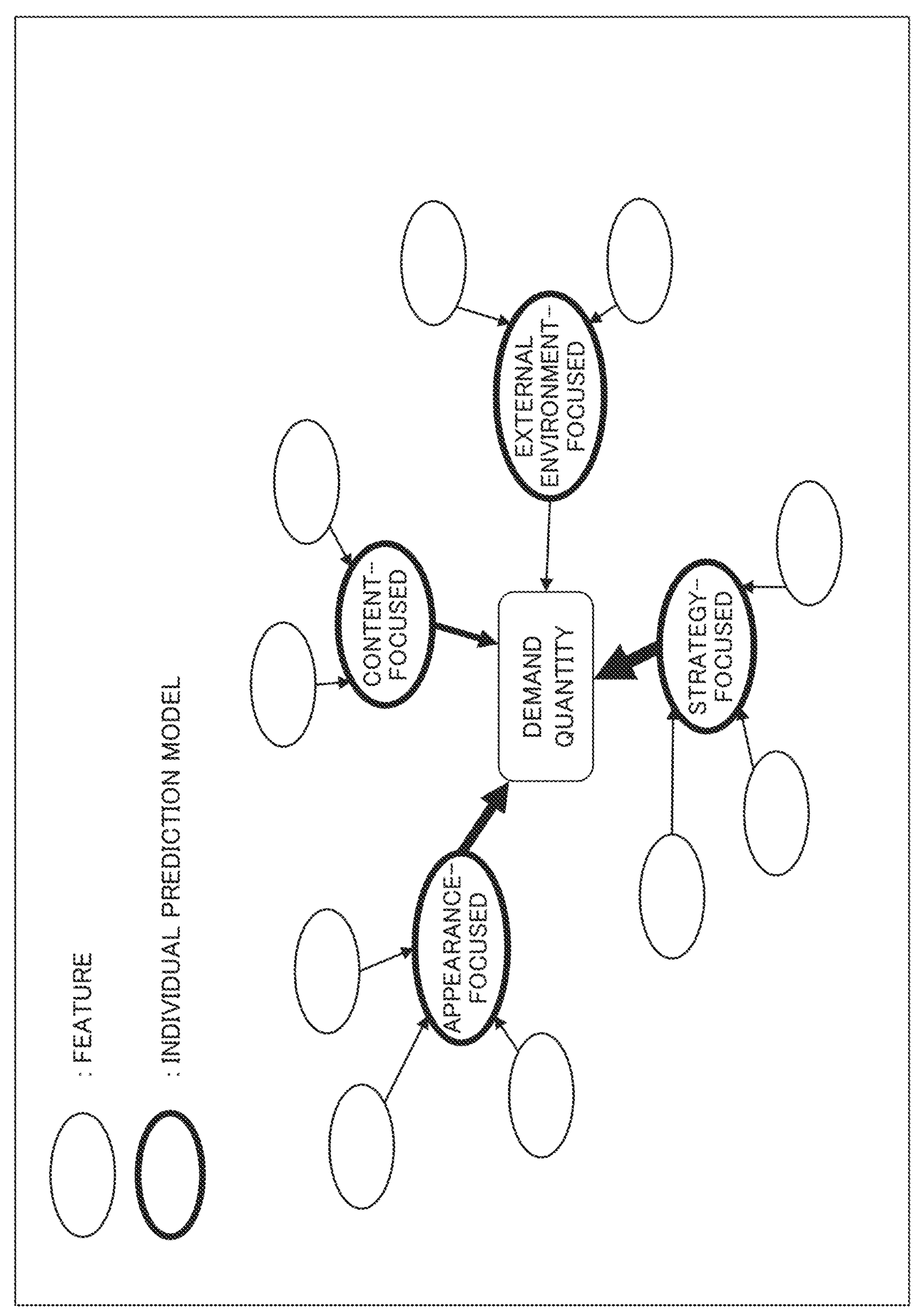
FIG. 8 is a diagram illustrating an example of a relationship graph according to the present disclosure.

By such various change operations, the demand prediction device 100 can calculate the predicted demand quantity in which various conditions regarding the target product considered by the user are considered. In other words, the demand prediction device 100 can present the predicted demand quantity reflecting the user's intention. Furthermore, the display control unit 150 may display a graph indicating the relationship between the demand quantity and the individual learning model. The graph indicating the relationship between the demand quantity and the individual learning model is referred to as a relationship graph. FIG. 8 is a diagram illustrating an example of the relationship graph. The relationship graph graphically illustrates how the demand quantity output by the integrated learning model affects the individual learning model. In the example of FIG. 8, icons of "appearance-focused", "content-focused", "external environment-focused", and "strategy-focused" are connected to the icon of "demand quantity" by arrows. Each of the icons directly connected to the "demand quantity" indicates the individual learning model. The thickness of the arrow indicates the weight. In this manner, the icon associated with the individual learning model may be highlighted in accordance with the weight. An icon indicating the feature related to the individual learning model is further connected to the icon indicating the individual learning model.

The display control unit 150 may display the relationship graph together with the parameter input screen of the integrated learning model. Therefore, the user can perform the operation of the parameter while checking the relationship graph. For example, the thickness of the arrow changes as the weight is changed by the user. Therefore, the user can intuitively understand how the change operation is affected.

Figure 9:
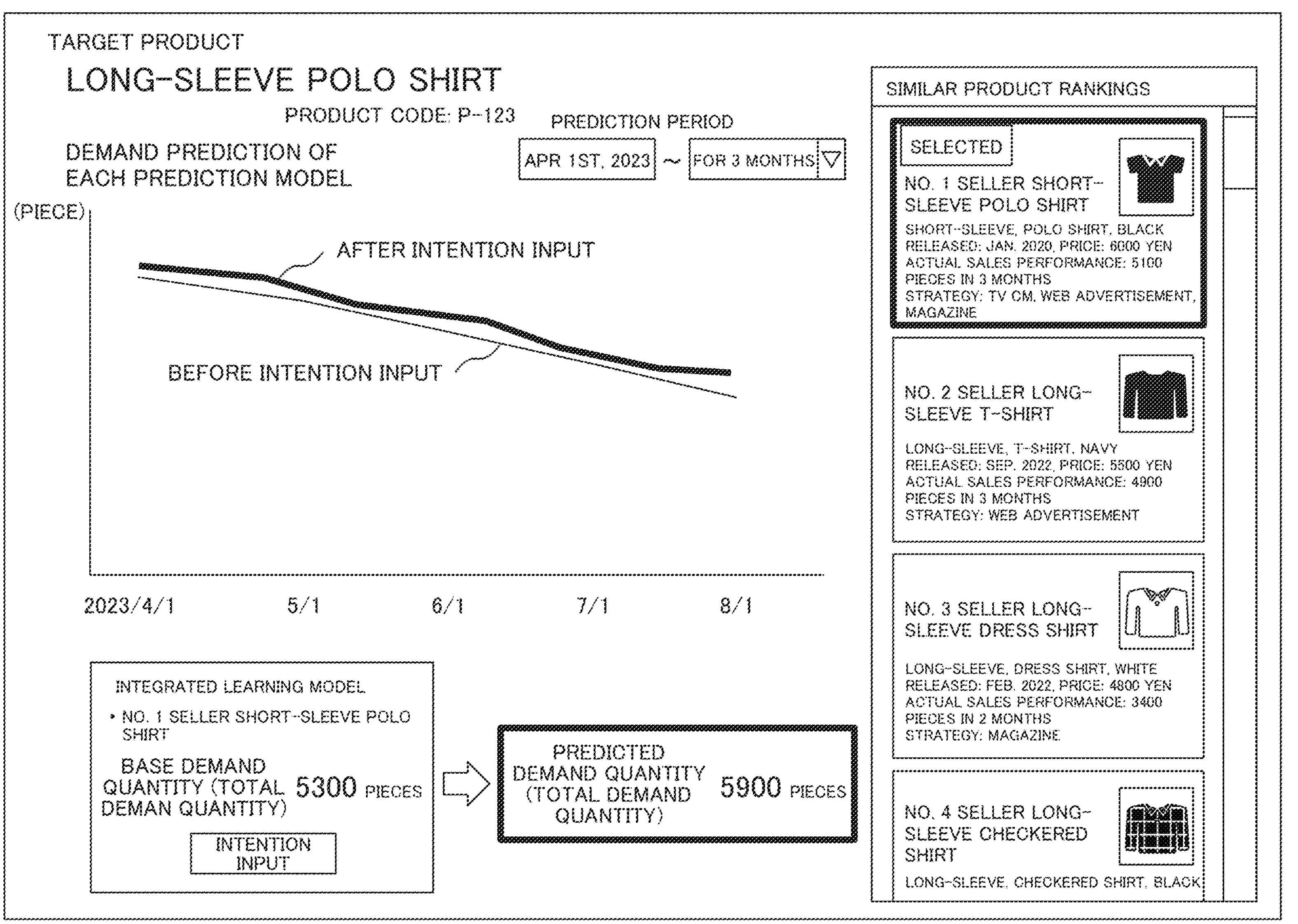
FIG. 9 is a diagram illustrating a second example of the output information according to the present disclosure.

Then, the display control unit 150 displays the demand quantity calculated by the prediction model reflecting the change operation. FIG. 9 is a diagram illustrating a second example of the output information. Specifically, FIG. 9 illustrates the output information in a case in which the operation of the parameter is performed for the integrated learning model. In this example, line graphs show a base demand quantity that is a demand quantity before the operations of the parameters are performed (before intention input) and a predicted demand quantity that is a demand quantity after the operations of the parameters are performed (after intention input). A change in the total demand quantity before the operations of the parameters are performed and after the operations of the parameters are performed is also illustrated. As described above, the display control unit 150 may display both the base demand quantity and the predicted demand quantity. As a result, the user can check a change in the demand quantity before and after the operations of the parameters.

As described above, the demand prediction device 100 can present to the user a product that exists as the similar product to the target product and how the demand quantity is calculated based on which similar product. In other words, the demand prediction device 100 can visualize the process of demand prediction regarding the target product. Therefore, as compared with a case in which only the result of the demand prediction is simply presented to the user, the demand prediction device 100 can present information that is more convincing to the user. In addition, the demand prediction device 100 can receive the user's operation in each process such as selection of the similar product and operations of the parameters for the prediction model while visualizing the demand prediction process. Therefore, for example, the user can perform an input operation while understanding which information is used in the demand prediction process among pieces of input information.

[Operation Example of Demand Prediction Device 100]

Next, an example of operation of the demand prediction device 100 will be described with reference to FIG. 10.

Figure 10:
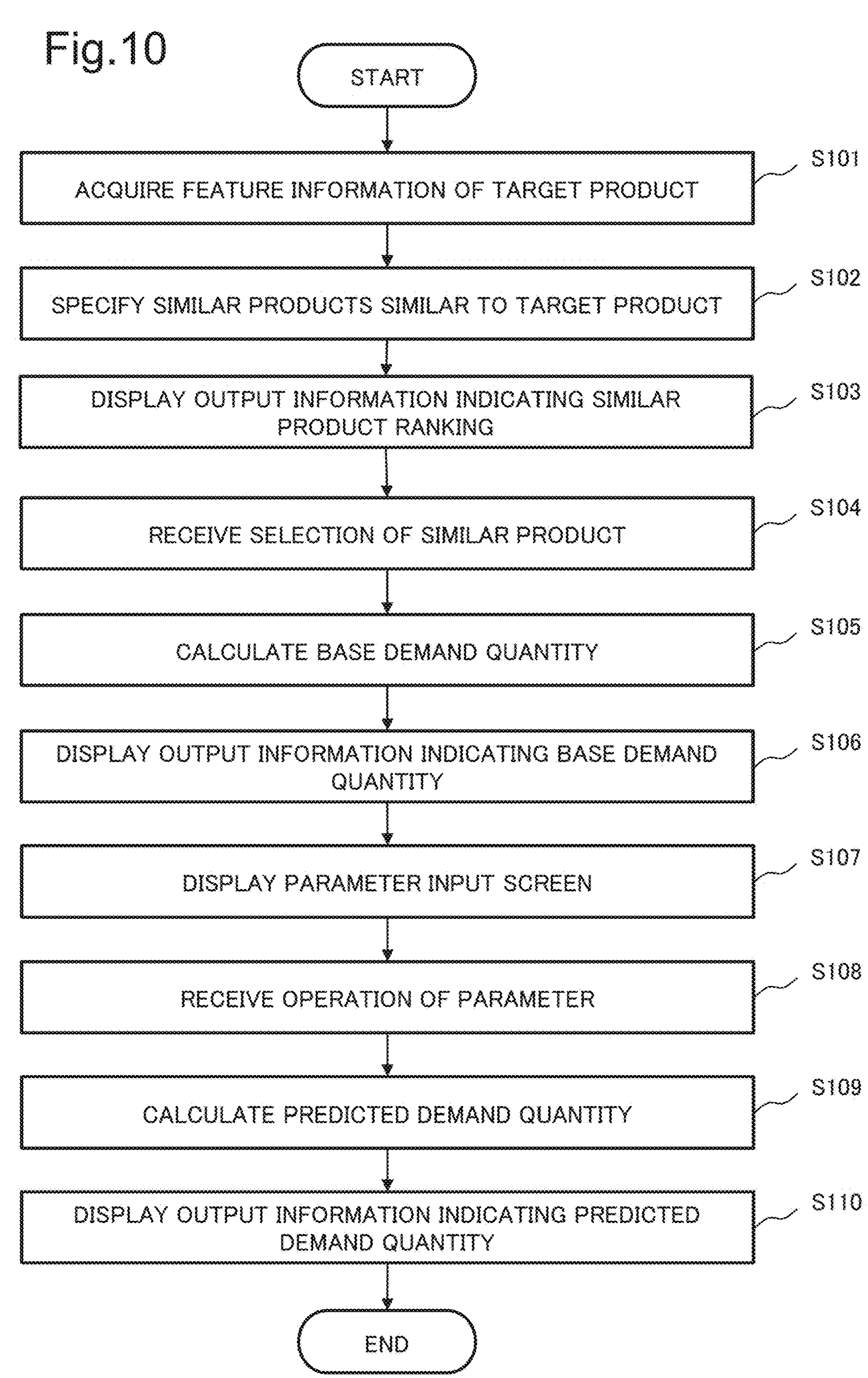
FIG. 10 is a second flowchart illustrating an example of an operation of the demand prediction device according to the present disclosure.

FIG. 10 is a flowchart for explaining an example of an operation of the demand prediction device 100. The acquisition unit 140 acquires the feature information of the target product (S101). For example, the display control unit 150 displays the input screen as illustrated in FIG. 5. The user selects the target product. The acquisition unit 140 acquires the feature information of the target product from the database stored in the storage unit 190 based on the identification information associated with the selected target product.

The specification unit 110 specifies the similar product similar to the target product by using the feature information of the target product (S102). The display control unit 150 displays the output information including the similar product ranking (S103). The operation reception unit 130 receives selection of the similar product from the user (S104).

The calculation unit 120 calculates the base demand quantity (S105). For example, the calculation unit 120 calculates the base demand quantity by using the integrated learning model in which the weight associated with the selected similar product is set. The display control unit 150 displays the output information indicating the calculated base demand quantity (S106). The display control unit 150 displays the output information as illustrated in FIG. 6, for example.

The operation reception unit 130 displays the parameter input screen associated with the prediction model (S107). In the example of FIG. 6, when the user selects an intention input icon, the operation reception unit 130 displays the parameter input screen. The operation reception unit 130 receives the operations of the parameters (S108). The calculation unit 120 calculates the predicted demand quantity by using the prediction model reflecting the received operation (S109). Then, the display control unit 150 displays the output information indicating the predicted demand quantity (S110).

The present operation example is merely an example. That is, the operation of the demand prediction device 100 is not limited to the above example.

As described above, the demand prediction device 100 of the second example embodiment is a device that predicts the demand quantity for the target product based on the prediction model. At this time, the prediction model is a model in which a plurality of types of individual learning models are integrated and weighting is set in each individual learning model. The individual learning model is a model that outputs the demand quantity in accordance with the feature of the product. The demand prediction device 100 specifies the similar products similar to the target product. The demand prediction device 100 calculates the base demand quantity for the target product by using the prediction model weighted in accordance with the similar product and the feature of the target product. Further, the demand prediction device 100 receives an operation of changing the weight for each of the individual learning models. Then, the demand prediction device 100 calculates the predicted demand quantity for the target product by using the prediction model reflecting the operation.

Here, the individual learning models are associated with the factors that are different from each other and affect the demand quantity. The individual learning model is a model that outputs the demand quantity with the feature related to the associated factor as an input. The prediction model aggregates the values obtained by respectively multiplying the demand quantities output to the individual learning models by the weights, and outputs the demand quantities.

Concerning the target product, there may be matters to be emphasized or matters not to be emphasized compared with similar products. For example, it is assumed that the user desires to place more importance on the appearance of the product, which is one of factors affecting the demand quantity, than on the similar product. The demand prediction device 100 can receive such consideration of the matters as, for example, an operation of changing the weight of the individual learning model. Accordingly, the demand prediction device 100 can calculate the demand quantity for the target product in a case in which such matters are taken into consideration. That is, the demand prediction device 100 can perform demand prediction in which the user's intention regarding the target product is considered.

The demand prediction device 100 may receive an operation of changing the mathematical formula indicating the individual learning model. At this time, the individual learning model is a model in which the relationship between the feature of the product and the demand quantity is learned by machine learning, and the demand prediction device 100 receives an operation of changing the data group used in the machine learning.

As a result, the demand prediction device 100 can receive not only the weight of each individual learning model but also the operation of changing individual learning itself. Therefore, the demand prediction device 100 can perform demand prediction reflecting a more detailed intention of the user.

The demand prediction device 100 may display a list of one or more specified similar products. The demand prediction device 100 may receive selection of one similar product, and calculate the base demand quantity for the target product by using the prediction model weighted according to the selected one similar product and the feature of the target product. Accordingly, the demand prediction device 100 can present the demand quantity calculated in consideration of the similar product desired by the user.

The demand prediction device 100 may display a graph indicating the relationship between the demand quantity and the individual learning model, with an icon associated with the individual learning model emphasized according to the weight. At this time, the demand prediction device 100 may display both the parameter input screen and the graph. Then, when receiving the operation of changing the weight for each of the individual learning models, the demand prediction device 100 updates the graph in accordance with the changed weight. As a result, the user can operate the parameter while checking the relationship graph or can intuitively understand how the change operation is affected.

[Application Examples of Demand Prediction Device]

In the present example embodiment, the demand prediction device 100 using the products related to clothing items as an example has been mainly described. The present example embodiment is not limited to this example, and the demand prediction device 100 can be applied to various products and various fields. For example, the demand prediction device 100 can be applied as devices that predict the demand quantities for products related to accessories and decorative items such as bags. That is, the demand prediction device 100 can calculate the demand quantities for products related to decorative articles by using features of the products. For example, when the product is a backpack from a specific brand, the category is a backpack, and the characteristics include color, material, functionality, brand name, capacity, usage, and the like. Also in this case, the features of the product may include information about strategies to be implemented for the product, information about the external environment during product sales, and the like. For example, the demand prediction device 100 can predict the demand quantity for the backpack of the specific brand before its release from information about the similar products.

For example, the demand prediction device 100 can be applied as devices that predict the demand quantities for products related to food such as fresh food, processed food, and beverages. That is, the demand prediction device 100 can calculate the demand quantities for products related to food by using features of the products. For example, when the product is orange juice, the category is fruit beverage, and the characteristics include ingredients, nutrients, juice content, origin of ingredients, volume, brand name, and the like. Also in this case, the features of the product may include information about strategies to be implemented for the product, information about the external environment during product sales, and the like. For example, the demand prediction device 100 can predict the demand quantity for orange juice before its release from information about the similar products.

In addition, the demand prediction device 100 according to the present disclosure is applicable to the medical healthcare field. For example, the demand prediction device 100 can calculate the demand quantities for products related to health foods by using features of the products. In this case, the categories are tablets, snacks, gels, beverages, and the like. The characteristics include products efficacy, ingredients, nutrients, and content volume. Further, the characteristics may include classifications of health functional foods such as functional labeled foods, function-affected foods, and specific health-use foods. In the products related to health foods, the features may include information about strategies to be implemented for the products, information about the external environment during product sales, and the like. For example, the demand prediction device 100 can predict the demand quantities for the health foods before its release from information about similar health foods after its release.

As described above, the demand prediction device 100 can support decision making for sales representatives across various products and various fields.

Modification Example 1

In a case in which the demand quantity is calculated by using the integrated learning model, the demand prediction device 100 may present information about the difference between the target product and the similar product.

For example, the calculation unit 120 calculates the base demand quantity for one similar product by using the integrated learning model. That is, the calculation unit 120 inputs the feature information of one similar product to the integrated learning model. At this time, the weight of each individual learning model is associated with one similar product. The calculation unit 120 calculates the base demand quantity for the target product by using the integrated learning model. That is, the calculation unit 120 inputs the feature information of the target product to the integrated learning model. At this time, the weight of each individual learning model is associated with one similar product.

Here, if there is no difference between the base demand quantity of the target product and the base demand quantity of one similar product, the features of the target product and one similar product are exactly the same. On the other hand, when there is a difference between the base demand quantity of the target product and the base demand quantity of one similar product, there may be some differences in feature between the target product and one similar product. For example, the calculation unit 120 calculates information indicating a degree to which the difference in the features affects the difference in the base demand quantity between the target product and one similar product. That is, the calculation unit 120 may calculate the degree of influence indicating the extent to which differences in which features between products affect differences in the base demand quantity. At this time, the display control unit 150 may display an index indicating the degree of influence for each of the features of the target product having a difference from one similar product.

Modification Example 2

The demand prediction device 100 may calculate the base demand quantity and the predicted demand quantity by using prediction models other than the integrated learning model.

In this case, there are two or more types of prediction models. The calculation unit 120 may calculate the base demand quantity for the target product for each prediction model. The operation reception unit 130 may receive selection of the prediction model from the user, and may receive the operations of the parameters that affect the output of the demand quantity for the selected prediction model. The calculation unit 120 may calculate the predicted demand quantity for the target product by using the prediction model in which the operations of the parameters have been performed.

The two or more types of prediction models may include a machine learning model tin which the relationship between the features of the product and the demand quantities are trained. The machine learning model may be generated by various algorithms such as neural networks, decision trees, and random forests. In this case, for example, the calculation unit 120 inputs the acquired feature information of the target product to the machine learning model. Then, the calculation unit 120 may calculate the demand quantity output by the machine learning model as the base demand quantity of the target product in the predetermined period.

The operation reception unit 130 may receive, for the machine learning model, an operation of changing a type of feature used in the machine learning model, a weight of each feature, or the like. At this time, the calculation unit 120 may calculate the predicted demand quantity of the target product in the predetermined period by inputting the feature information of the target product to the machine learning model reflecting the change operation. The parameters to be changed are not limited to this example.

The two or more types of prediction models may include other models that output the demand quantity based on the similar product similar to the target product. An example of the other models that output the demand quantity based on the similar product is a model that outputs the demand quantity based on the actual sales performance of the product. This model is referred to as a first actual performance model. The first actual performance model may be a model that receives identification information of the product, specifies the actual sales performance of the product of the received identification information, and outputs the demand quantity based on the specified actual sales performance. For example, the calculation unit 120 may input identification information of one similar product to the first actual performance model, and calculate the demand quantity based on the actual sales performance of one similar product as the base demand quantity for the target product. One similar product is one of the similar products specified by the specification unit 110. One similar product may be, for example, a similar product with the highest similarity. Alternatively, one similar product may be a similar product selected by the user. The selection of the similar product is received by the operation reception unit 130.

For example, when the identification information of one similar product is input, the first actual performance model specifies the actual sales performance of one similar product from the actual performance information in the storage unit 190. For example, in a case in which the demand quantity for the target product until a predetermined number of days elapses from the start of release is predicted, the first actual performance model outputs the demand quantity until a predetermined number of days elapses from the start of release from the actual sales performance of one similar product. The calculation unit 120 calculates the output demand quantity as the base demand quantity for the target product. As described above, the calculation unit 120 may calculate the base demand quantity for the target product based on the actual sales performance of one similar product.

The operation reception unit 130 may receive, for the first actual performance model, an operation of changing a total demand quantity per predetermined period and the demand quantity per unit period. At this time, the calculation unit 120 may calculate the predicted demand quantity for the target product by using the first actual performance model according to the change operation. For example, it is assumed that the operation of changing the total demand quantity per predetermined period is received. In this case, the fluctuation of the demand quantity per predetermined period is changed in accordance with the changed total demand quantity. The parameters to be changed are not limited to this example.

Another example of the other models that output the demand quantity based on the similar product is a model that outputs the demand quantity based on the actual sales performance of two or more products. This model is referred to as a second actual performance model. The second actual performance model may be a model that receives identification information of two or more products, specifies the actual sales performance of the products of the received identification information, and outputs a demand quantity obtained by performing a predetermined arithmetic operation on the demand quantity based on the specified actual sales performance. For example, the calculation unit 120 may input identification information of two or more similar product to the second actual performance model, and calculate the demand quantities obtained by performing a predetermined arithmetic operation on the demand quantities based on the specified actual sales performances of the two or more similar products as the base demand quantity for the target product.

An example of the two or more similar products is a predetermined number of similar products with higher similarity. For example, the calculation unit 120 inputs, to the second actual performance model, the identification information of the similar products with the highest to third highest similarities among the similar products specified by the specification unit 110. The two or more similar products may be two or more similar products selected by the user. In this case, the calculation unit 120 inputs the identification information of the two or more selected similar products to the second actual performance model.

The predetermined arithmetic operation may be an average. For example, the second actual performance model may calculate, as the base demand quantity for the target product, a value obtained by averaging the demand quantities based on the actual sales performances of the two or more similar products. The predetermined arithmetic operation may be a weighted average. For example, the second actual performance model may calculate, as the base demand quantity for the target product, a value obtained by averaging the demand quantities based on the actual sales performances of the two or more similar products in consideration of the weight. The weight in this case may be a value that increases as the similarity is higher.

For example, in a case in which the demand quantity for the target product until a predetermined number of days elapses from the start of release is predicted, the second actual performance model calculates the demand quantities until a predetermined number of days elapses from the start of release from the actual sales performances of the similar products. Then, the weighted average in which the weight according to the similarity is considered is performed on the calculated demand quantity. The calculation unit 120 calculates the output demand quantity as the base demand quantity for the target product. As described above, the calculation unit 120 may calculate the base demand quantity for the target product by performing the weighted average based on the weight according to the similarity on the actual sales performances of a predetermined number of similar products with the higher similarity.

The operation reception unit 130 may receive, similarly for the second actual performance model, an operation of changing a total demand quantity per predetermined period and the demand quantity per unit period. At this time, the calculation unit 120 may calculate the predicted demand quantity for the target product by using the first actual performance model according to the change operation. The parameters to be changed are not limited to this example.

Figure 11:
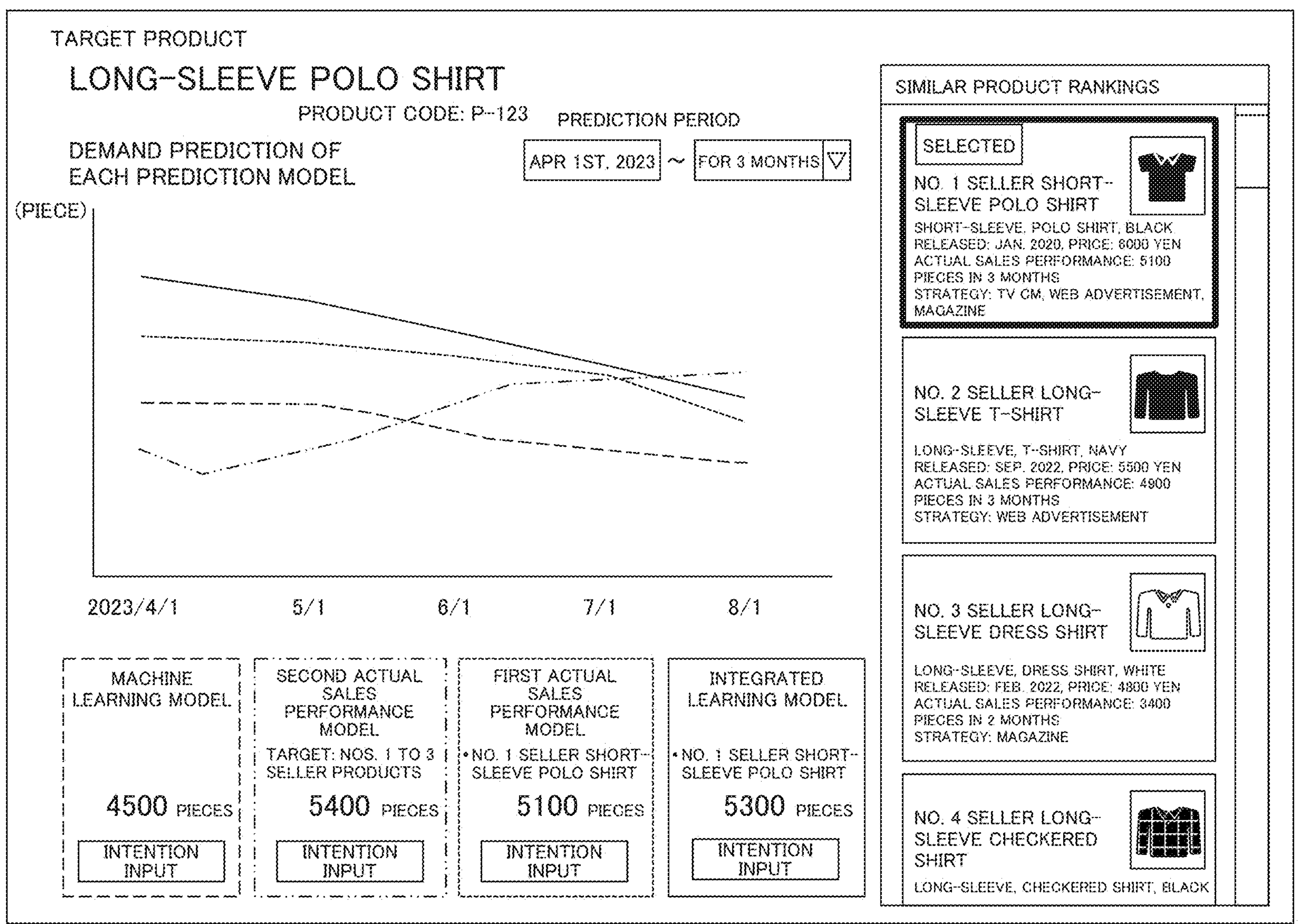
FIG. 11 is a diagram illustrating a third example of the output information according to the present disclosure.

The display control unit 150 may display the output information including the calculated demand quantity of each prediction model. FIG. 11 is a diagram illustrating a third example of the output information. In the example of FIG. 11, the base demand quantities associated with the two or more prediction models calculated with three months from Apr. 1, 2023 as the target period is illustrated. The two or more prediction models include the integrated learning model, the first actual performance model, the second actual performance model, and the machine learning model. In this example, the integrated learning model and the first actual performance model output the demand quantity based on the selected similar product "short-sleeve polo shirt". The second actual performance model outputs the demand quantities based on the similar products with the first to third similar product rankings.

As described above, the demand prediction device 100 can collectively present the base demand quantities calculated by the two or more types of prediction models.

The user selects at least one of the prediction models and performs the operations of the parameters on the selected prediction model. For example, the user selects an icon of "intention input" of a desired prediction model. As the icon is selected, the operation reception unit 130 receives selection of the prediction model. The display control unit 150 displays the parameter input screen for the selected prediction model. As described above, the demand prediction device 100 can receive the operations of the parameters for each prediction model. The demand prediction device 100 can calculate the predicted demand quantity according to the operation for each prediction model.

Modification Example 3

The demand prediction device 100 may be a device integrated with the terminal device 200. For example, the demand prediction device 100 may be a device included in the terminal device 200. Alternatively, the demand prediction device 100 may be a device implemented by installing a program in the terminal device 200.

<Configuration Example of Hardware of Demand Prediction Device>

Figure 12:
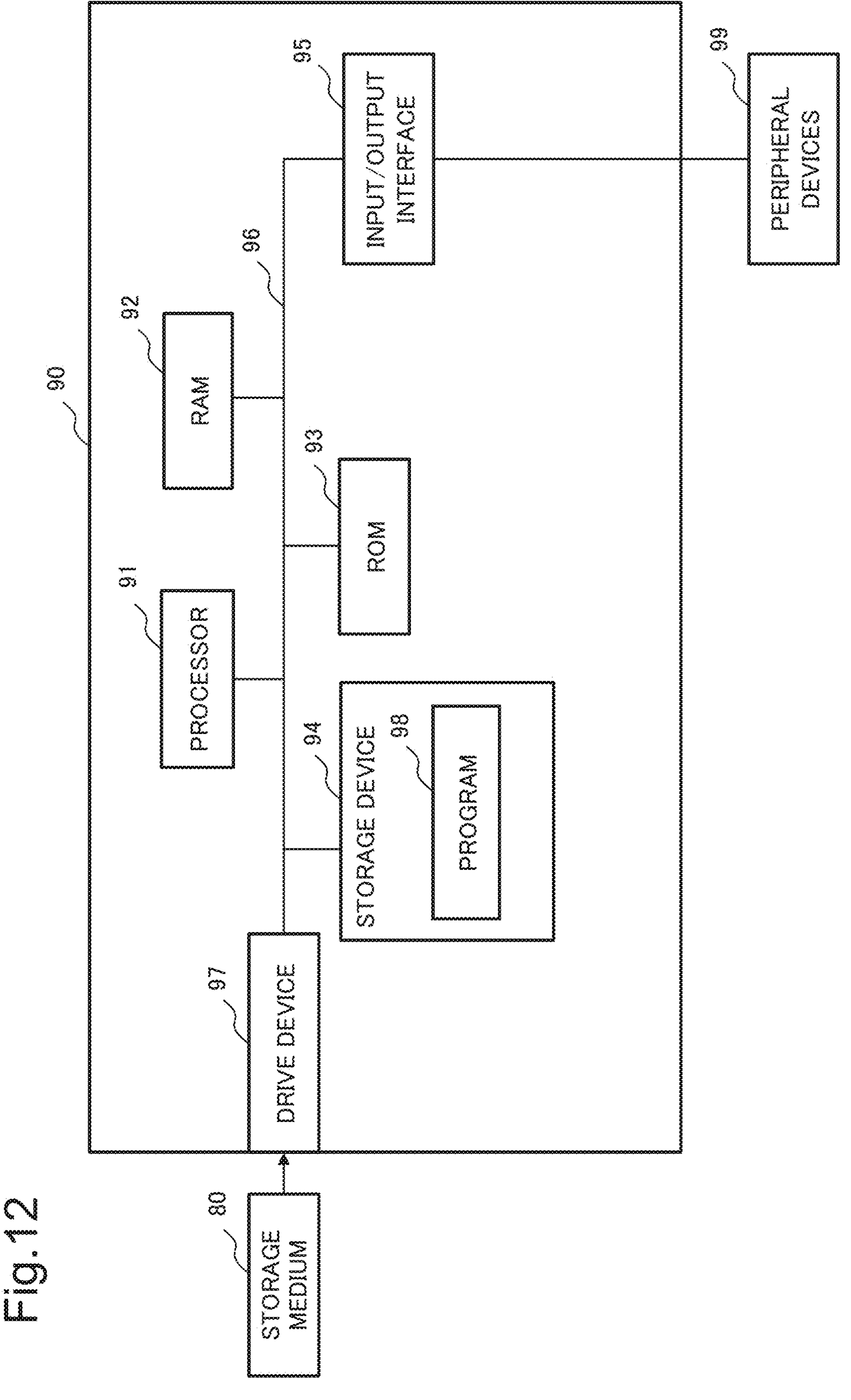
FIG. 12 is a block diagram illustrating an example of a hardware configuration of a computer device that implements the demand prediction device according to the present disclosure.

Hardware constituting the demand prediction device according to the first and second example embodiments will be described. FIG. 12 is a block diagram illustrating an example of a hardware configuration of a computer device that constituting the demand prediction device according to each of the example embodiments. In a computer device 90, the demand prediction device and the demand prediction method described in each of the example embodiments and each of the modification examples are implemented. For example, the demand prediction device and the like described in each example embodiment and each modification example may have the hardware configuration illustrated in FIG. 12.

As illustrated in FIG. 12, the computer device 90 includes a processor 91, a random access memory (RAM) 92, a read only memory (ROM) 93, a storage device 94, an input/output interface 95, a bus 96, and a drive device 97. The demand prediction device may be implemented by a plurality of electric circuits.

The storage device 94 stores a program (computer program) 98. The processor 91 executes the program 98 of the acceptance support system using the RAM 92. Specifically, for example, the program 98 includes a program causing a computer to execute the processes illustrated in FIGS. 3 and 10. When the processor 91 executes the program 98, the functions of each of the constituents of the demand prediction device are implemented. The program 98 may be stored in the ROM 93. The program 98 may be recorded in a storage medium 80 and read using the drive device 97, or may be transmitted from an external device (not illustrated) to the computer device 90 via a network (not illustrated).

The input/output interface 95 exchanges data with a peripheral device 99 (a keyboard, a mouse, a display device, and the like). The input/output interface 95 functions as a means that acquires or outputs data. The bus 96 connects the constituents to each other.

There are various modification examples of a method for implementing the demand prediction device. For example, each of components included in the demand prediction device can be implemented as a dedicated device. The demand prediction device can be implemented based on a combination of a plurality of devices.

A processing method for recording, in a storage medium, a program for enabling each of the constituents in the functions of each of the example embodiments, reading the program recorded in the storage medium as a code, and executing the program in a computer is also included in the scope of each of the example embodiments. That is, a computer-readable storage medium is also included in the scope of each of the example embodiments. A storage medium in which the above-described program is recorded and the program itself is also included in each of the example embodiments.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. The program recorded in the storage medium is not limited to a program that executes processing alone, and programs that are operated on an operating system (OS) to execute processing in cooperation with other software and the function of an extension board are also included in the scope of each of the example embodiments.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims.

The above-described example embodiments and modification examples can be appropriately combined.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

Various goals may be set when selling products. The product manager makes decisions to achieve such goals. For example, various actions such as planning in each process of the supply chain and promotion strategies are considered. At this time, the results of the demand prediction described above may be used.

For example, the demand quantity for the target product is predicted by using the information about the similar product similar to the target product. Here, the similar product and the target product are different products. Therefore, there may be factors to be considered for the target product. Alternatively, a person who is in charge (user) may want to emphasize a specific factor regarding the target product.

There is a need for the user to use the results of demand prediction reflecting such factors when considering actions. That is, there may be cases in which the results of demand prediction reflecting the user's intention are desired.

According to the present disclosure, it is possible to perform demand prediction that takes into account the user's intention for the target product.

Some or all of the above example embodiments may be described as in the following Supplementary Notes, but are not limited to the following description.

[Supplementary Note 1]

A demand prediction device predicting a demand quantity for a target product based on a prediction model, the prediction model being a model in which two or more types of individual learning models are integrated and a weigh is set for each of the individual learning models, the individual learning model being a model that outputs the demand quantity in accordance with a feature of a product, the demand prediction device including:

a specification unit for specifying a similar product similar to the target product;

a calculation unit for calculating a base demand quantity for the target product by using the prediction model weighted in accordance with the similar product and a feature of the target product; and an operation reception unit for receiving an operation of changing the weight for each of the individual learning models, wherein the calculation unit calculates a predicted demand quantity for the target product by using the prediction model reflecting the operation.

[Supplementary Note 2]

The demand prediction device according to Supplementary Note 1, wherein the individual learning models are associated with factors that are different from each other and affect the demand quantity, the individual learning model is a model that outputs the demand quantity with a feature related to an associated factor as an input, and the prediction model outputs the demand quantity by aggregating values obtained by multiplying the demand quantity output for each of the individual learning models by each weight.

[Supplementary Note 3]

The demand prediction device according to Supplementary Note 1 or 2, wherein the operation reception unit receives an operation of changing a mathematical formula indicating the individual learning model.

[Supplementary Note 4]

The demand prediction device according to Supplementary Note 3, wherein the individual learning model is a model in which a relationship between the feature of the product and the demand quantity is trained by machine learning, and the operation reception unit receives an operation of changing for a data group used in the machine learning.

[Supplementary Note 5]

The demand prediction device according to Supplementary Note 1, further including:

a display control unit for displaying a list of one or more specified similar products, wherein the operation reception unit receives selection of one similar product, and the calculation unit calculates a base demand quantity for the target product by using the feature of the target product and the prediction model weighted in accordance with the selected one similar product.

[Supplementary Note 6]

The demand prediction device according to Supplementary Note 5, wherein the display control unit displays a graph indicating a relationship between the demand quantity and the individual learning model, and including an icon associated with the individual learning model, the icon being emphasized in accordance with the weight.

[Supplementary Note 7]

The demand prediction device according to Supplementary Note 6, wherein the display control unit displays both a parameter input screen and the graph, and in a case where the operation reception unit receives an operation of changing the weight for each of the individual learning models, the display control unit updates the graph in accordance with the changed weight.

[Supplementary Note 8]

The demand prediction device according to Supplementary Note 1, further including:

an acquisition unit for acquiring feature information indicating the feature related to the target product, wherein the specification unit specify the similar product from a database having feature information of two or more products by using the feature information of the target product.

[Supplementary Note 9]

A demand prediction method for predicting a demand quantity for a target product based on a prediction model, the method including:

specifying a similar product similar to the target product;

calculating a base demand quantity for the target product by using the prediction model weighted in accordance with the similar product and a feature of the target product, the prediction model being a model in which two or more types of individual learning models are integrated and a weigh is set for each of the individual learning models, the individual learning model being a model that outputs the demand quantity in accordance with a feature of a product;

receiving an operation of changing the weight for each of the individual learning models; and calculating a predicted demand quantity for the target product by using the prediction model reflecting the operation.

[Supplementary Note 10]

The demand prediction method according to Supplementary Note 9, wherein the individual learning models are associated with factors that are different from each other and affect the demand quantity, the individual learning model is a model that outputs the demand quantity with a feature related to an associated factor as an input, and the prediction model outputs the demand quantity by aggregating values obtained by multiplying the demand quantity output for each of the individual learning models by each weight.

[Supplementary Note 11]

The demand prediction method according to Supplementary Note 9 or 10, further including:

receiving an operation of changing a mathematical formula indicating the individual learning model.

[Supplementary Note 12]

The demand prediction method according to Supplementary Note 11, wherein the individual learning model is a model in which a relationship between the feature of the product and the demand quantity is trained by machine learning, and the method further includes receiving an operation of changing for a data group used in the machine learning.

[Supplementary Note 13]

The demand prediction method according to Supplementary Note 9, further including:

displaying a list of one or more specified similar products;

receiving selection of one similar product; and calculating a base demand quantity for the target product by using the feature of the target product and the prediction model weighted in accordance with the selected one similar product.

[Supplementary Note 14]

The demand prediction method according to Supplementary Note 13, further including:

displaying a graph indicating a relationship between the demand quantity and the individual learning model, and indicating an icon associated with the individual learning model, the icon being emphasized in accordance with the weight.

[Supplementary Note 15]

The demand prediction method according to Supplementary Note 14, further including:

displaying both a parameter input screen and the graph; and in a case where an operation of changing the weight for each of the individual learning models is received, updating the graph in accordance with the changed weight.

[Supplementary Note 16]

The demand prediction method according to Supplementary Note 9, further including:

acquiring feature information indicating the feature related to the target product; and specifying the similar product from a database having feature information of two or more products by using the feature information of the target product.

[Supplementary Note 17]

A program for predicting a demand quantity for a target product based on a prediction model, the program causing a computer to execute:

a process of specifying a similar product similar to the target product;

a process of calculating a base demand quantity for the target product by using the prediction model weighted in accordance with the similar product and a feature of the target product, the prediction model being a model in which two or more types of individual learning models are integrated and a weigh is set for each of the individual learning models, the individual learning model being a model that outputs the demand quantity in accordance with a feature of a product;

a process of receiving an operation of changing the weight for each of the individual learning models, and wherein the process of calculating includes calculating a predicted demand quantity for the target product by using the prediction model reflecting the change operation.

[Supplementary Note 18]

The program according to Supplementary Note 17, wherein the individual learning models are associated with factors that are different from each other and affect the demand quantity, the individual learning model is a model that outputs the demand quantity with a feature related to an associated factor as an input, and the prediction model outputs the demand quantity by aggregating values obtained by multiplying the demand quantity output for each of the individual learning models by each weight.

[Supplementary Note 19]

The program according to Supplementary Note 17 or 18, wherein the process of receiving includes receiving an operation of changing a mathematical formula indicating the individual learning model.

[Supplementary Note 20]

The program according to Supplementary Note 19, wherein the individual learning model is a model in which a relationship between the feature of the product and the demand quantity is trained by machine learning, and the process of receiving includes receiving an operation of changing for a data group used in the machine learning.

[Supplementary Note 21]

The program according to Supplementary Note 17, causing the computer to further execute a process of displaying a list of one or more specified similar products, wherein the process of receiving includes receiving selection of one similar product, and the process of calculating includes calculating a base demand quantity for the target product by using the feature of the target product and the prediction model weighted in accordance with the selected one similar product.

[Supplementary Note 22]

The program according to Supplementary Note 21, wherein the process of displaying includes displaying a graph indicating a relationship between the demand quantity and the individual learning model, and including an icon associated with the individual learning model, the icon being emphasized in accordance with the weight.

[Supplementary Note 23]

The program according to Supplementary Note 22, wherein the process of displaying includes displaying both a parameter input screen and the graph, and the process of displaying includes updating, in a case where an operation of changing the weight for each of the individual learning models is received in the process of receiving, the graph in accordance with the changed weight.

[Supplementary Note 24]

The program according to Supplementary Note 17, causing the computer to further execute a process of acquiring feature information indicating the feature related to the target product, wherein the process of specifying includes specifying the similar product from a database having feature information of two or more products by using the feature information of the target product.

The invention claimed is:

1. A demand prediction device predicting a demand quantity for a target product based on a prediction model, the demand prediction device comprising:

at least one memory configured to store instructions; and at least one processor configured to execute the instructions to:

specify a similar product similar to the target product;

calculate a base demand quantity for the target product by using a feature of the target product and the prediction model weighted in accordance with the similar product, the prediction model being a model in which two or more types of individual learning models are integrated and a weight is set for each of the individual learning models, each of the individual learning models being a model that outputs the demand quantity in accordance with a feature of a product;

cause a display device to display a parameter input screen for receiving an input of a value of the weight and a graphical object representing the weight set for each of the individual learning models;

receive an operation of changing the weight for each of the individual learning models via the parameter input screen;

calculate a predicted demand quantity for the target product by using the prediction model reflecting the operation; and update a display mode of the graphical object in response to the operation to reflect the changed weight.

2. The demand prediction device according to claim 1, wherein the individual learning models are associated with factors that are different from each other and affect the demand quantity, the individual learning model is a model that outputs the demand quantity with a feature related to an associated factor as an input, and the prediction model outputs the demand quantity by aggregating values obtained by multiplying the demand quantity output for each of the individual learning models by each weight.

3. The demand prediction device according to claim 1, wherein the at least one processor is further configured to execute the instructions to:

receive an operation of changing a mathematical formula indicating the individual learning model.

4. The demand prediction device according to claim 3, wherein the individual learning model is a model in which a relationship between the feature of the product and the demand quantity is trained by machine learning, and the at least one processor is configured to receive an operation of changing for a data group used in the machine learning.

5. The demand prediction device according to claim 1, wherein the at least one processor is further configured to execute the instructions to:

display a list of one or more specified similar products;

receive selection of one similar product; and calculate a base demand quantity for the target product by using the feature of the target product and the prediction model weighted in accordance with the selected one similar product.

6. The demand prediction device according to claim 5, wherein the graphical object is included in a relationship graph indicating a relationship between the demand quantity and the individual learning models, and the at least one processor is further configured to execute the instructions to:

display the graph which includes an icon associated with the individual learning model and an icon associated with the demand quantity, the icon associated with the individual learning model being emphasized in accordance with the weight.

7. The demand prediction device according to claim 6, wherein the icon associated with the individual learning model is connected to the icon associated with the demand quantity by an arrow, and the at least one processor is further configured to execute the instructions to:

update a thickness of the arrow in accordance with the changed weight.

8. The demand prediction device according to claim 1, wherein the at least one processor is further configured to execute the instructions to:

acquire feature information indicating the feature related to the target product; and specify the similar product from a database having feature information of two or more products by using the feature information of the target product.

9. A demand prediction method for predicting a demand quantity for a target product based on a prediction model, the method comprising:

specifying a similar product similar to the target product;

calculating a base demand quantity for the target product by using the prediction model weighted in accordance with the similar product and a feature of the target product, the prediction model being a model in which two or more types of individual learning models are integrated and a weight is set for each of the individual learning models, the individual learning model being a model that outputs the demand quantity in accordance with a feature of a product;

displaying, on a display device, a parameter input screen for receiving an input of a value of the weight and a graphical object representing the weight set for each of the individual learning models;

receiving an operation of changing the weight for each of the individual learning models via the parameter input screen;

calculating a predicted demand quantity for the target product by using the prediction model reflecting the operation; and updating a display mode of the graphical object in response to the operation to reflect the changed weight.

10. A non-transitory computer readable recording medium storing a program for predicting a demand quantity for a target product based on a prediction model, the program causing a computer to execute:

specifying a similar product similar to the target product;

calculating a base demand quantity for the target product by using the prediction model weighted in accordance with the similar product and a feature of the target product, the prediction model being a model in which two or more types of individual learning models are integrated and a weight is set for each of the individual learning models, the individual learning model being a model that outputs the demand quantity in accordance with a feature of a product;

displaying, on a display device, a parameter input screen for receiving an input of a value of the weight and a graphical object representing the weight set for each of the individual learning models;

receiving an operation of changing the weight for each of the individual learning models via the parameter input screen;

calculating a predicted demand quantity for the target product by using the prediction model reflecting the operation; and updating a display mode of the graphical object in response to the operation to reflect the changed weight.

* * * * *